(12) United States Patent
Dorn et al.

(10) Patent No.: US 12,365,459 B1
(45) Date of Patent: Jul. 22, 2025

(54) TRANSPORTABLE DIP TANK

(71) Applicants: Walt Dorn, Simi Valley, CA (US); William Ward, Simi Valley, CA (US)

(72) Inventors: Walt Dorn, Simi Valley, CA (US); William Ward, Simi Valley, CA (US)

( * ) Notice: Subject to any disclaimer, the term of this patent is extended or adjusted under 35 U.S.C. 154(b) by 471 days.

(21) Appl. No.: 17/955,046

(22) Filed: Sep. 28, 2022

Related U.S. Application Data

(60) Provisional application No. 63/249,677, filed on Sep. 29, 2021.

(51) Int. Cl.
| | |
|---|---|
| *B64D 1/16* | (2006.01) |
| *A62C 3/02* | (2006.01) |
| *A62C 37/36* | (2006.01) |
| *B65D 88/14* | (2006.01) |
| *B65D 90/00* | (2006.01) |
| *B65D 90/18* | (2006.01) |

(52) U.S. Cl.
CPC .............. *B64D 1/16* (2013.01); *A62C 3/0235* (2013.01); *A62C 37/04* (2013.01); *B65D 88/14* (2013.01); *B65D 90/008* (2013.01); *B65D 90/18* (2013.01)

(58) Field of Classification Search
CPC .. B65D 83/759; B65D 47/2018; B65D 88/14; B65D 90/008; B65D 90/18; B65D 47/205; B65D 47/2056; B65D 47/2062; B64D 1/16; A62C 3/0235; A62C 37/04
See application file for complete search history.

(56) References Cited

U.S. PATENT DOCUMENTS

| | | | | |
|---|---|---|---|---|
| 2,989,756 A | * | 6/1961 | Gaston | A45D 27/22 4/627 |
| 5,301,376 A | * | 4/1994 | Herbert | A47K 1/02 220/379 |
| 5,313,676 A | * | 5/1994 | Wright | A47K 1/02 4/631 |
| 5,526,539 A | * | 6/1996 | Bower | A45D 19/04 312/317.3 |
| 6,161,228 A | * | 12/2000 | Wietecha | A47K 1/02 4/625 |
| 2020/0055668 A1 | * | 2/2020 | Strong | B63B 27/30 |

* cited by examiner

*Primary Examiner* — Kareen K Thomas
(74) *Attorney, Agent, or Firm* — Sandy Lipkin

(57) ABSTRACT

A mobile, portable, transportable dip tank to support wildfire fighting operations for both aerial firefighting, as well as ground support functionality. The dip tank includes the ability to be loaded in any orientation on to a transport vehicle, store onboard tools and includes an interior cistern that can be attached to water sources on the ground to continuously fill the cistern. An auto-fill/auto-regulating valve is incorporated into the still-well of the cistern in the air gap. Chamfered edges on the exterior prevent safety snag hazards. Lighting is incorporated into the interior and exterior of the cistern as well as exterior to the entire device. A communications suite is provided which allows for remote controlling of the features from any suitable device utilizing all modern forms of electronic communication.

12 Claims, 12 Drawing Sheets

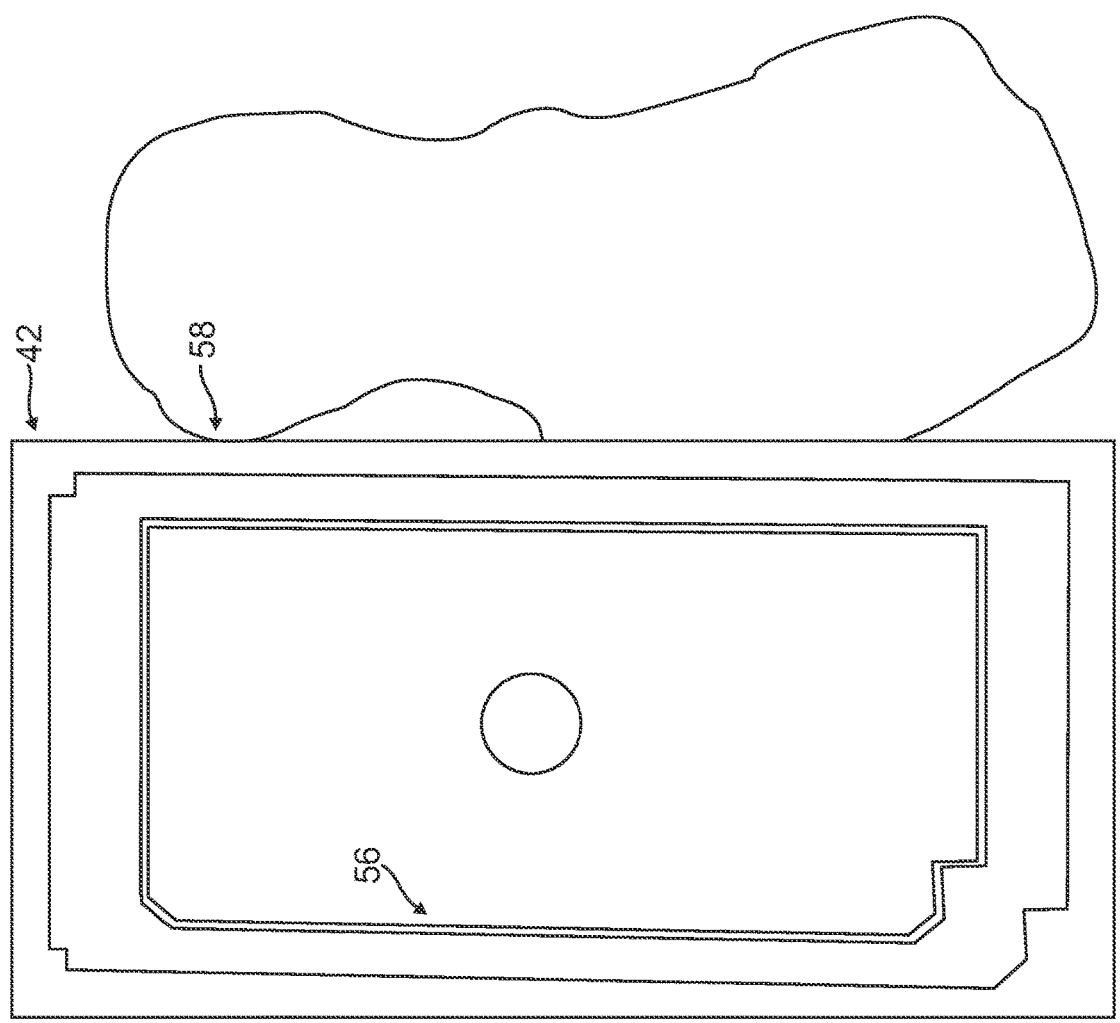

TRANSPORTABLE DIP TANK

REFERENCE TO PRIOR APPLICATION

This application claims priority of the provisional patent application 63/249,677, filed Sep. 29, 2021 entitled TRANSPORTABLE DIP TANK by Walt Dorn and William Ward.

BACKGROUND OF THE INVENTION

Field of the Invention

The present invention relates generally to the field of helicopter firefighting, ground unit support, retardant/enhancers mixing, storage and hover fill operations, and more specifically toward a fully intact, portable and transportable intact dip tank. The transportable dip tank of the instant invention is also used as a cistern for a variety of functions, including but not limited to, permanent and mobile retardant/enhancer mixing plants in support of aerial firefighting operations. The dip tank is also used as a cistern or "nursing tank" to support wildfire remote ground units and operations.

Description of the Prior Art

Of increasing concern is the general warming condition around the globe and more specifically is the ongoing drought conditions being experienced in the United States. It is more crucial now than ever that aerial firefighting efforts be properly supported with cutting edge technology in order to maximize safety, efficiency and effectiveness in fighting the ever-increasing wildfires. Historically, aerial assets such as helicopters have been relatively small and capable of holding only a few hundred gallons of water, retardant or enhancer for fighting wildfires. The focus now is on larger and more robust airframes capable of carrying a thousand gallons or more. To complicate matters, the old style collapsible "pumpkin" dip tanks are not only ineffective but actually pose a threat to the aircraft as they become unstable when being emptied and can become air born causing a threat to the aircraft.

The constantly changing environment in which the wildfires are being fought now includes not only the wilderness but also the wildland urban interface (WUI), which is where human development encroaches into the wilderness, i.e., homes, ranches, farms, agriculture as well as ever increasing need for space to house businesses. As such, there is increasing availability of a significant water source through the fire hydrant systems now being required for development into the WUI. The transportable dip tank of the instant invention is designed to take advantage of this by incorporating an automatically self-regulating feature that allows for the device to be connected directly to an available hydrant, activated and left unattended while self-filling continuously. The benefits are multi-fold and include the freeing-up of an engine company to better assist in evacuation and firefighting. Furthermore, this type of innovation allows for overall water savings since the unit does not allow the cistern in the transportable dip tank to be overfilled and lose water.

Additional concerns and limitations being placed onto wildfire fighting operations include, but are not limited to, the overall safety of the airframe and crew. It is widely held that "hover-fill" operations are where the largest degree of danger are for the aircraft. When hover-filling, the aircraft must hang in the air over the water source while either dipping a bucket from a long line or pumping water on-board through a "snorkel" that is extended down from the aircraft into the water. A variety of hazards are apparent when hover-filling such as, encountering an unseen underwater hazard or "snag". Any snag can imperil the aircraft and cause a crash. Another danger with hover-filling is that this is typically done over an open body of water. Again, the hazard here is that should the aircraft experience even a minor malfunction, there is a chance of a crash into the water. The transportable dip tank of the instant invention mitigates against these hazards as it is always over a "snag free" hover-fill location, and it is designed to accommodate even the smallest helicopter. Should a malfunction be experienced, the helicopter can land adjacent to the transportable dip tank without the worry of a rotor strike.

Hover-fill operations have been developed in order to increase the efficiency of the overall aircraft operations. However, there are increasing pressures from the EPA water resource agencies and environmental groups to eliminate hover-fill operations from most bodies of fresh water in the U.S. and abroad. The reasons are typically that the aircraft is putting exhaust pollution into the water column of the lake, river or reservoir being used. Another reason is that there have been accidents where the aircraft crashed or ditched into the water wherein the loss of the aircraft and crew were catastrophic. There is also an ongoing contamination of the watershed through the loss and recovery efforts. Finally, there is an ongoing battle with aquatic invasive species (AIS) transmission. AIS is a scourge on the freshwater systems throughout the world. Unfortunately, aerial firefighting operations have contributed to the AIS transmission over the years, resulting in regulations for aircraft and their decontamination procedures in many parts of the world including the United States.

SUMMARY OF THE INVENTION

The preferred embodiment of the instant inventions teaches a mobile, portable, transportable intact dip tank for use in firefighting operations to support aerial and ground-based firefighting comprising: a top side; a bottom side; a front side; a rear side; a first side; and a second side wherein an interior portion is defined by the connection of said top, bottom, front, rear, first and second sides; a cistern housed in said interior portion; a still well in said cistern; an auto fill/auto regulating valve with a float ball assembly in said still well; and a cabinet is housed in said interior portion proximate said rear side.

The above embodiment can be further modified by defining that cabinet doors are on said rear side that are openable and closeable to reveal or obscure said cabinet.

The above embodiment can be further modified by defining that wheels are attached said bottom side.

The above embodiment can be further modified by defining that said cistern houses liquids, said liquids coming from the group comprising: water, retardants, enhancers.

The above embodiment can be further modified by defining that said dip tank is made of steel.

The above embodiment can be further modified by defining that said first side and said second have chamfered edges.

The above embodiment can be further modified by defining that said cistern has lights incorporated into an interior portion of said cistern.

The above embodiment can be further modified by defining that said cistern has lights incorporated into an exterior portion of said cistern.

The above embodiment can be further modified by defining that lights are affixed to an exterior of said dip tank.

The above embodiment can be further modified by defining that said dip tank is manually operated.

The above embodiment can be further modified by defining that said dip tank is operated remotely using a communication suite between said dip tank and a user in another location.

The above embodiment can be further modified by defining that said communication suite utilizes the world wide web, multi-wired and wireless networks including, but not limited to LAN, WLAN, WAN, MAN PAN VPN LTE, satellite, BLUETOOTH®, MESH, IR and microwave, internet, cloud, TCP, IP, HTTP, BUS, cellular networks with and without. LTE, networking computers and servers, both hosted and local.

The above embodiment can be further modified by defining that bottom rails are situated on said bottom side of said dip tank for ease of rolling on and off or truck beds.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 12 is a top view of the transportable dip tank of the instant invention highlighting the internal lights of the cistern as well as the external lights of the tank for night time firefighting but not showing the still well or cabinets.

DETAILED DESCRIPTION OF A PREFERRED EMBODIMENT

Figure 1:
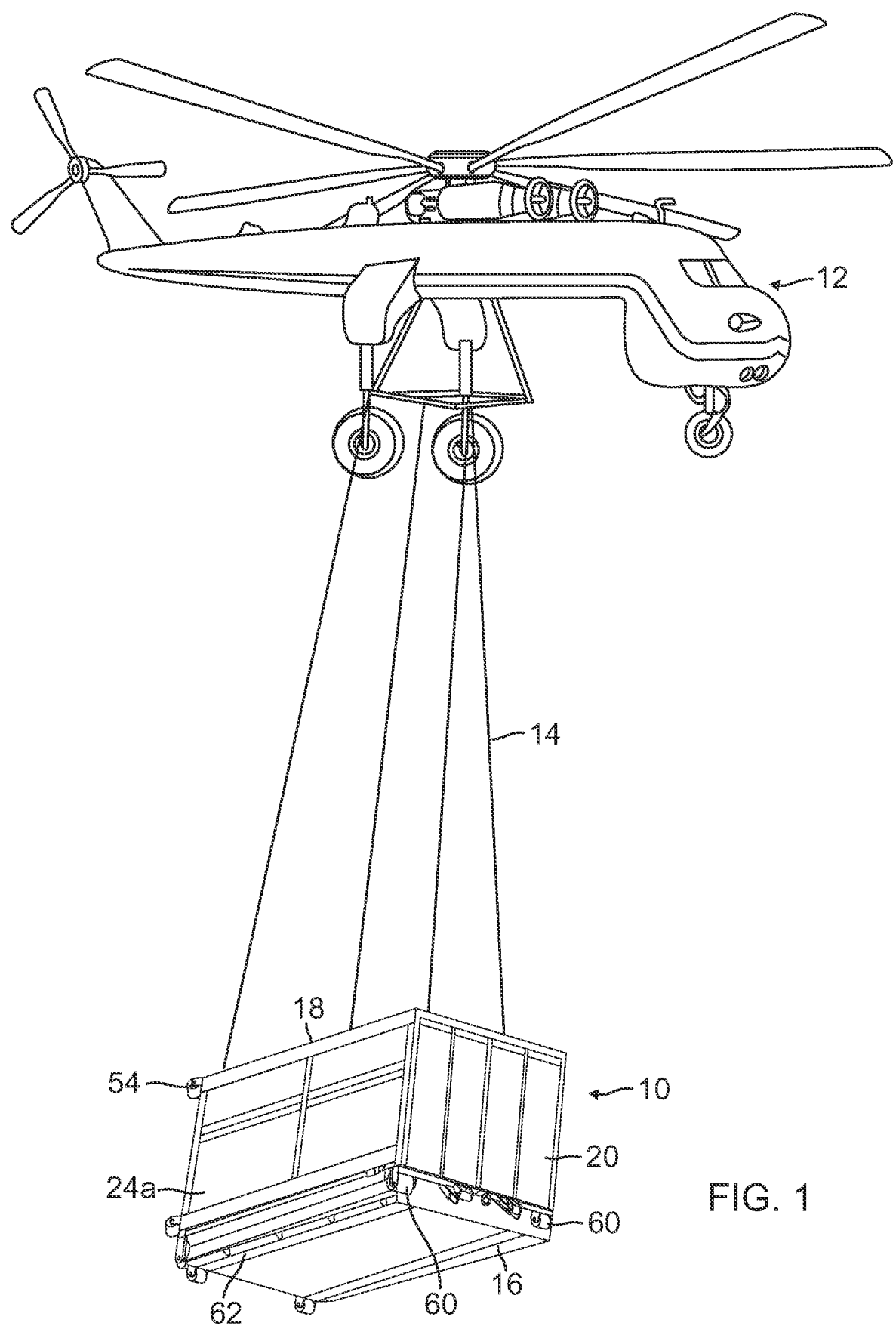
FIG. 1 is a side view of a helicopter transporting the transportable dip tank of the instant invention.

Referring to the drawings, the preferred embodiment is illustrated and described by reference characters and denote similar elements throughout several views of the transportable dip tank of the instant invention.

The basic embodiment of the present instant invention provides for a mobile, transportable intact dip tank with cistern for use in fighting wildfires, which is the next generation of support equipment desperately needed in support of the ever-increasing size and capability of worldwide wildland firefighting operations. The device of the instant invention is a robust, portable and transportable intact dip tank with cistern designed and engineered specifically for wildfire combat support operations in support of the aerial assets as well as ground-based assets and personnel.

The device includes an auto-regulating and filling valve that is suited for use in conjunction with public drinking water systems as the device also incorporates an air-gap as is required by most drinking water regulatory agencies to separate the incoming water from the cistern thereby not allowing for any back-flow or syphoning into the water system.

The transportable dip tank has a built-in storage and equipment cabinet. This cabinet houses the main auto fill valve body and can house additional equipment and features.

The engineering and design allow for the device to be loaded in two directions or orientations which allow for transport without any special U.S. Department of Transportation (DOT) permitting. The design also allows for the dip tank to be loaded onto any flat-bed truck or trailer, a flat-bed "wrecker", a tilt-bed truck or trailer as well as any standard roll-on/roll-off truck and/or trailer. Since the dip tank is not a permanent structure, it allows for flexibility in a variety of uses with the least amount of effort as it does not require any assembly once it arrives on scene.

The dip tank is built of steel, which allows for cost effectiveness and the use of durable materials. There are no vinyl liners to tear, rip, shred and leak. The steel construction makes for easy and rapid repairs should damages occur.

The dip tank has a built in still-well that allows for the upper portion of the auto-fill regulating valve, the float ball and shut off assembly to be safely isolated from the rotor-prop wash of turbulent air created during hover-fill operations. The enclosure protects the auto-fill/regulating float ball from debris as well.

The transportable dip tank is capable of manual and remote-control operations for the purposes of activating the auto fill/self-regulating valve system. This allows for the dip tank to be turned on and activated by direct connection to an existing hard-wired network or via wen/internet-based or enabled devices including BLUETOOTH® as well as cellular and/or satellite-based devices.

The dip tank utilizes several activation features including but not limited to the following: a client/server application with user interface devices, such as a desktop computer, smart phone, tablet, control panel and the like, thereby being capable of communicating the inputs and outputs to a server using numerous communication protocols, i.e., TCP/IP, HTTP, MODBUS, etc., that are multi-layered.

All communications are capable across various wired and wireless networks, such as LAN, WLAN, WAN, MAN, PAN, VPN, LTE. Satellite, BLUETOOTH®, mesh, IR, microwave, and the like. The length of these network connections can be from 0 (embedded) to infinity.

Each device on the network has an IP address. Multiple networks can be used to connect the client to the server, and the server and the IO Device.

The inputs and outputs are exchanged with the server via the protocols and networks described above.

The server communicates with the IO Device at or on the dip tank site, thereby providing the instruction to turn the fill valve on or off, turn on or off the interior tank/cabinet light, to turn on or off the exterior area light, activate cameras, anemometers, as well as other features.

The server also polls the status of solenoids, lights, gauges, sensors and stores these values in a file system to be displayed by the user interface application.

These capabilities expand its use beyond just the pilot using a radio, using microphone clicks, which uses a radio signal. Given today's multifaceted forms of modern communications, there is a need to provide as many options as possible regarding what access method best suits a particular situation when using the transportable dip tank. This takes the communication beyond the antiquated radio clicks required by outdated systems.

The communications suite incorporated into the instant invention primarily uses the Internet via the I.P. (Internet Protocol) but will also have the options of cellular/LTE (Long Term Evolution) and/or satellite when in remote locations. The integrated communications suite enables the user to control and turn on or off any features in order to monitor the status of gauges and sensors located on-board the dip tank from their control facility or mobile platform, including but not limited to, computers and or mobile devices.

A user's device, such as a smart phone, tablet, PC or network computer, will be used to access a Wi-Fi App or computer-based website in order to interface with the dip tank. This communication is made possible by using the proprietary hardware and software that may be resident in either the communications suite on-board the dip tank or on the server or the cloud.

This provides the flexibility to the dip site owners like water agencies or governments who will want to use their own data management systems to control the dip tank features and monitor the gauges and sensors control. Fire departments can either activate the dip tank directly or request activation from the dip site owner. Typically, users want to know that their dip tank and dip site will be coming into service and not just have a helicopter pilot activate it autonomously without notice and by just showing up and begin using and drawing water from the tank. This is important as water departments may need to adjust the water distribution system to accommodate that large of GPM draw.

In the preferred embodiment the instant invention provides for a portable, transportable fully intact mobile dip tank 10 with cistern 42 in support of aerial firefighting. The purpose of invention is to provide a safe place for aerial firefighting assets to replenish their load(s) of firefighting fluids during hover-gill operations both day and night. The device represents the latest innovations in support of aerial firefighting efforts, specifically in support of the newer, larger and more capable for both government and private firefighting aerial firefighting assets.

The apparatus 10 is designed, engineered and built expressly for the safety of personnel and equipment in support of hover-fill firefighting operations. The steel structure makes for the most robust intact dip tank 10 available.

The on-board built-in cabinet supports the laval auto-fill/ auto regulating valve system 32 that is incorporated into the tank 10. The on-board cabinet features a large equipment storage area intrinsic to the cabinet to allow for the storage of mission critical assets.

The design of the interior and exterior of the device 10 are made to eliminate any possible hang-ups or snags above 2' from the ground that could pose a threat to hover-fill operations. All the interior walls are smooth, and the external walls include horizontal chamfered edges 54 to eliminate 90° angles facing down, which could be possible snag points.

In addition to the cabinet and external safety features built into the tank 10, the omni-directional loading is another feature that allows for the tank 10 to be loaded onto transport in a forward or rear facing orientation. This feature is available for both flatbed transport as well as traditional roll-on/roll-off operations.

Another feature of the invention is the lighting of both the interior of the cistern portion of the apparatus 10, as well as the exterior perimeter of the entire tank 10 as this allows for spatial orientation and landscape differentiation for the personnel on the aircraft on approach for hover-fill operations. The lighting also makes for a safer work environment for ground crew personnel.

Figure 2:
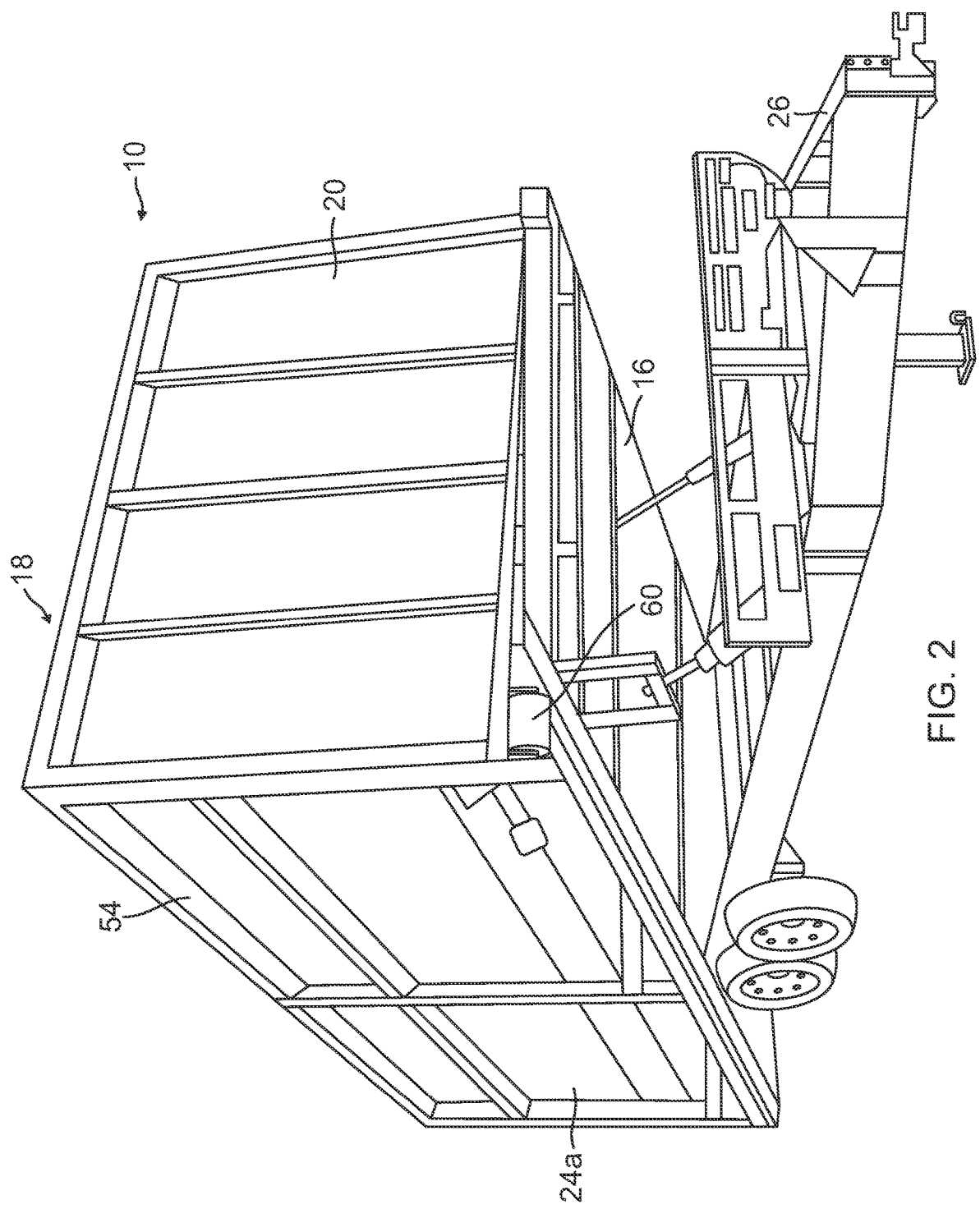
FIG. 2 is a front perspective view of the transportable dip tank of the instant invention as it angled on a trailer.

FIG. 1 shows a view of transportable dip tank 10 as it is being transported via helicopter 12 through the attachment of cables 14. The tank 10 is primarily a rectangular 3-dimensional box with a bottom 16, a top 18, a front 20, a rear 22 and two connecting sides 24A, 24B. The bottom 16 includes wheels 60 at the corners that allow for ease of transport as well as protective rails 62 on the bottom 16 of the tank 10 that allows for ease of rolling the tank 10 on and off trucks. As seen in FIG. 2, the tank 10 can also be attached a vehicle, such as a trailer 26, as illustrated for transport beyond where it is dropped.

Figure 3:
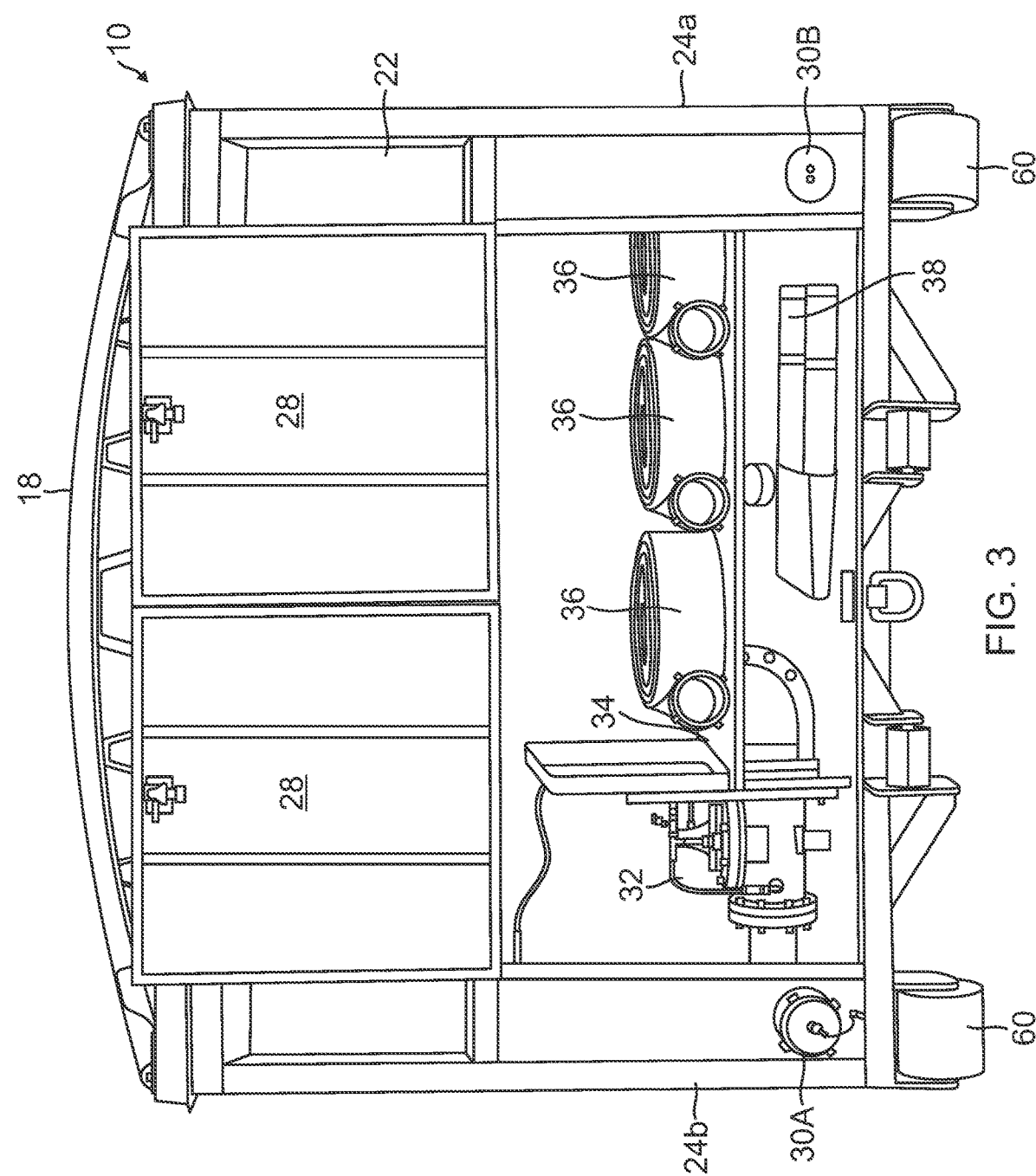
FIG. 3 is a rear view of the transportable dip tank of the instant invention with the rear cabinet doors open exposing the inside of the storage cabinet.
Figure 4:
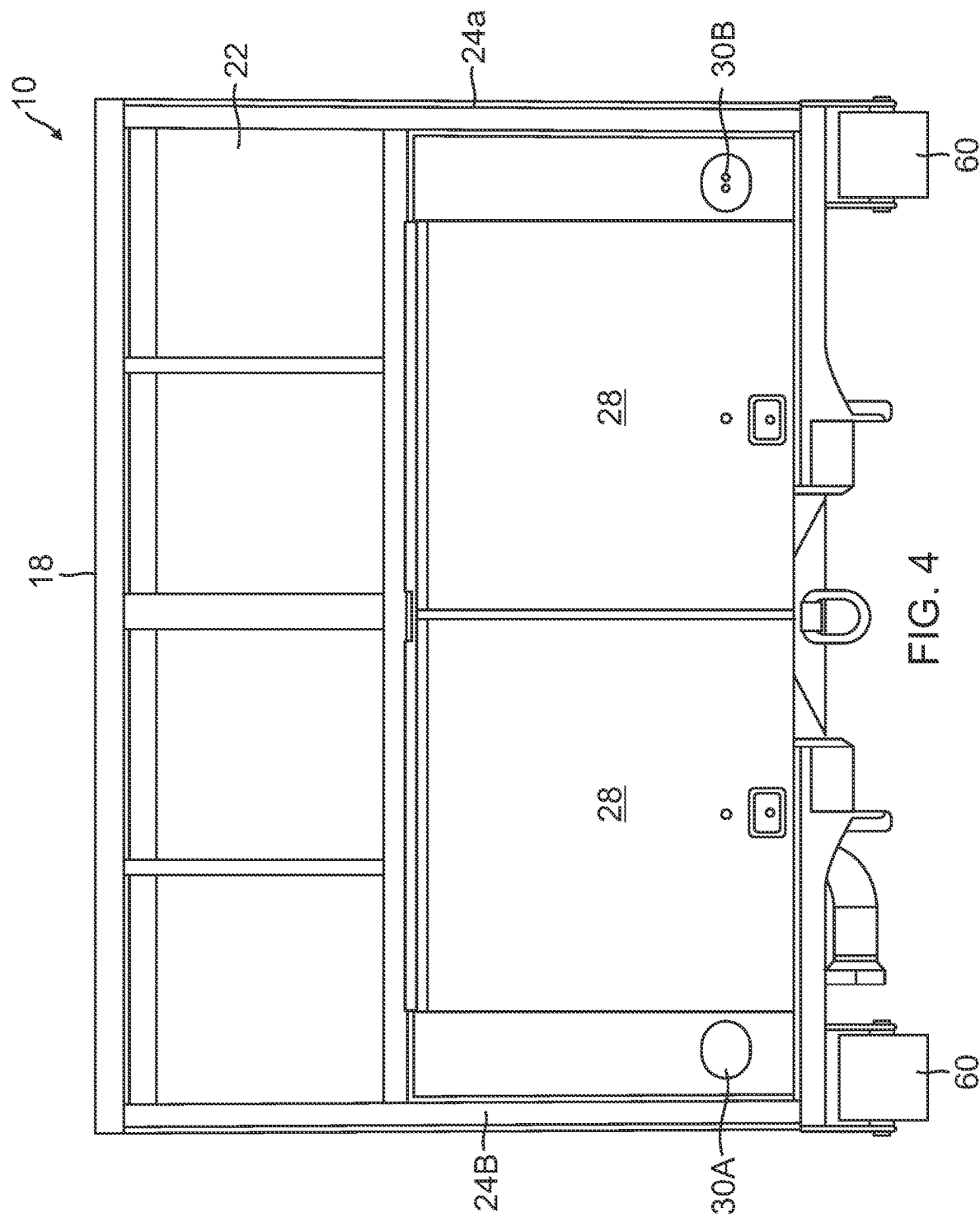
FIG. 4 is the same view as FIG. 3 with the rear cabinet doors closed.

FIGS. 3 and 4 show the rear side 22 of the tank 10 which include doors 28 that open to reveal the cabinetry inside, which include shelves 34 onto which hoses 36 and other tools 38 can be stored. Fire Department Connections (FDC) 30A, 30B are located on either side of the rear 22 toward the bottom 16. Viewable from the rear 22 when the cabinet doors 28 are open is the auto-fill/auto regulating valve 32 shown in detail in FIG. 10 where the float ball assembly 52 is illustrated.

Figure 5:
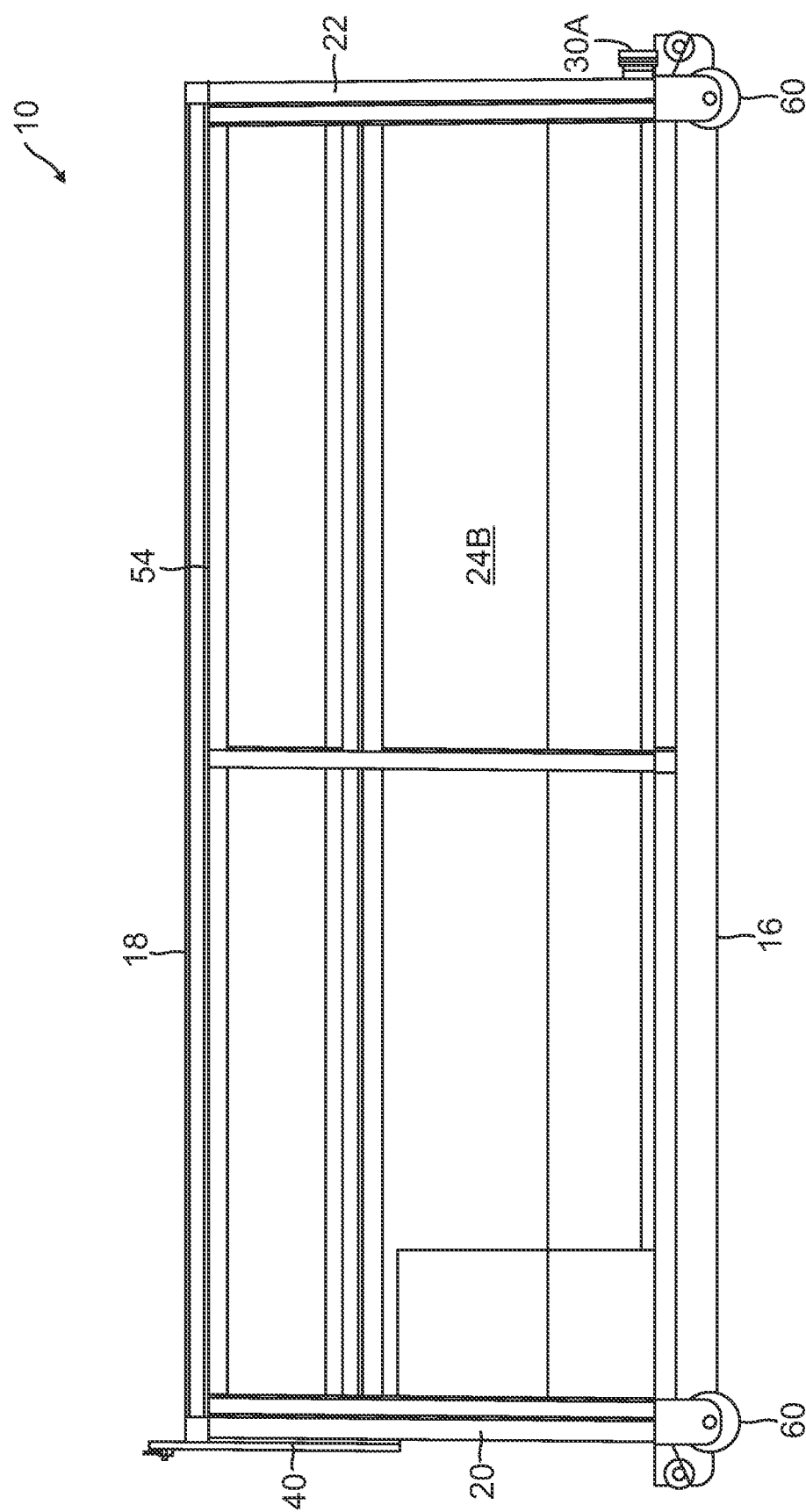
FIG. 5 is a side view of the transportable dip tank of the instant invention.
Figure 11:
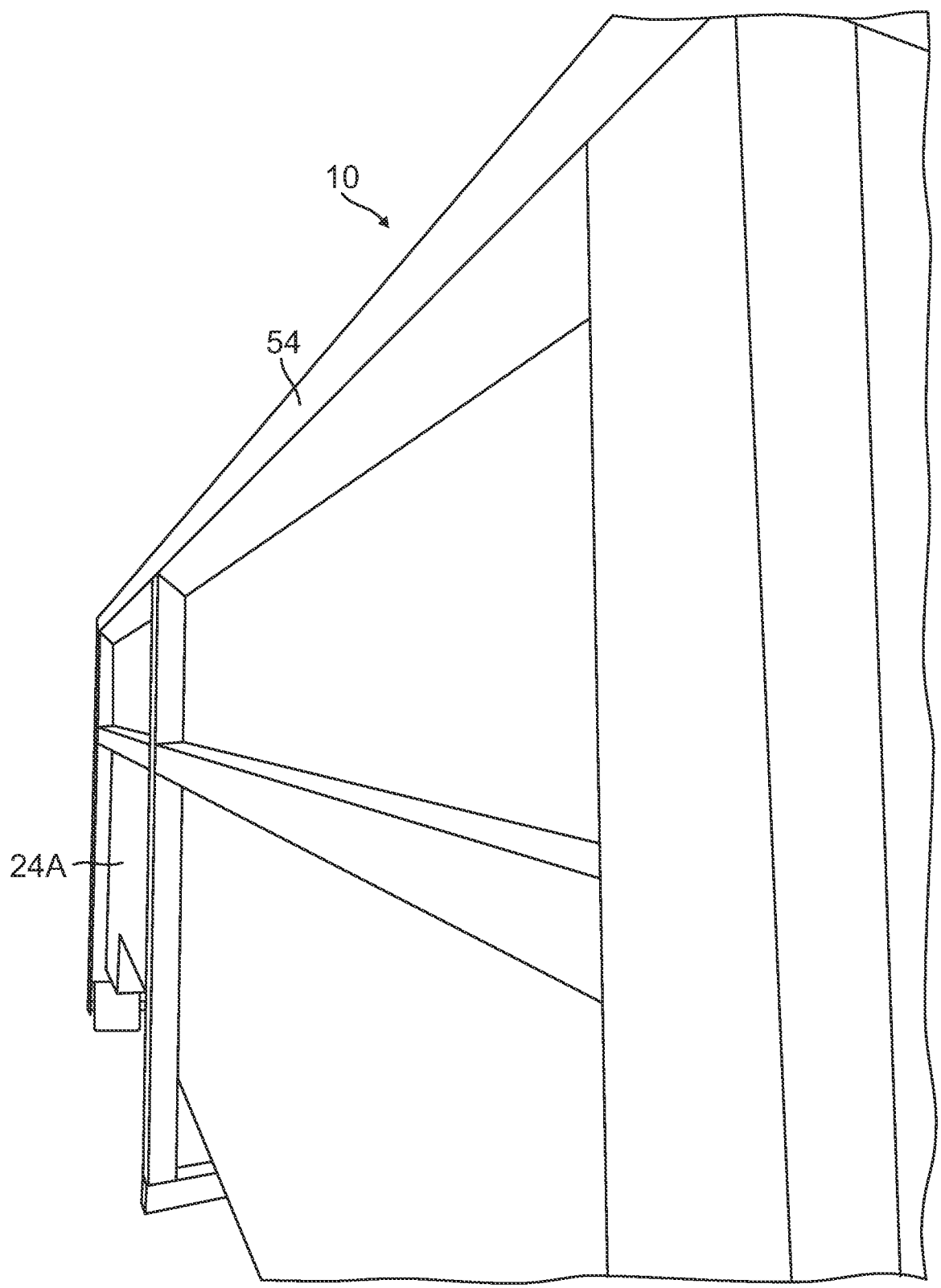
FIG. 11 is a side view of the outside of the transportable dip tank of the instant invention highlighting the chamfer design of the exterior which eliminates snag hazards.

FIG. 5 shows one of the sides 24B of the tank where the chamfered edge 54 is shown, also shown in perspective view in FIG. 11.

Figure 6:
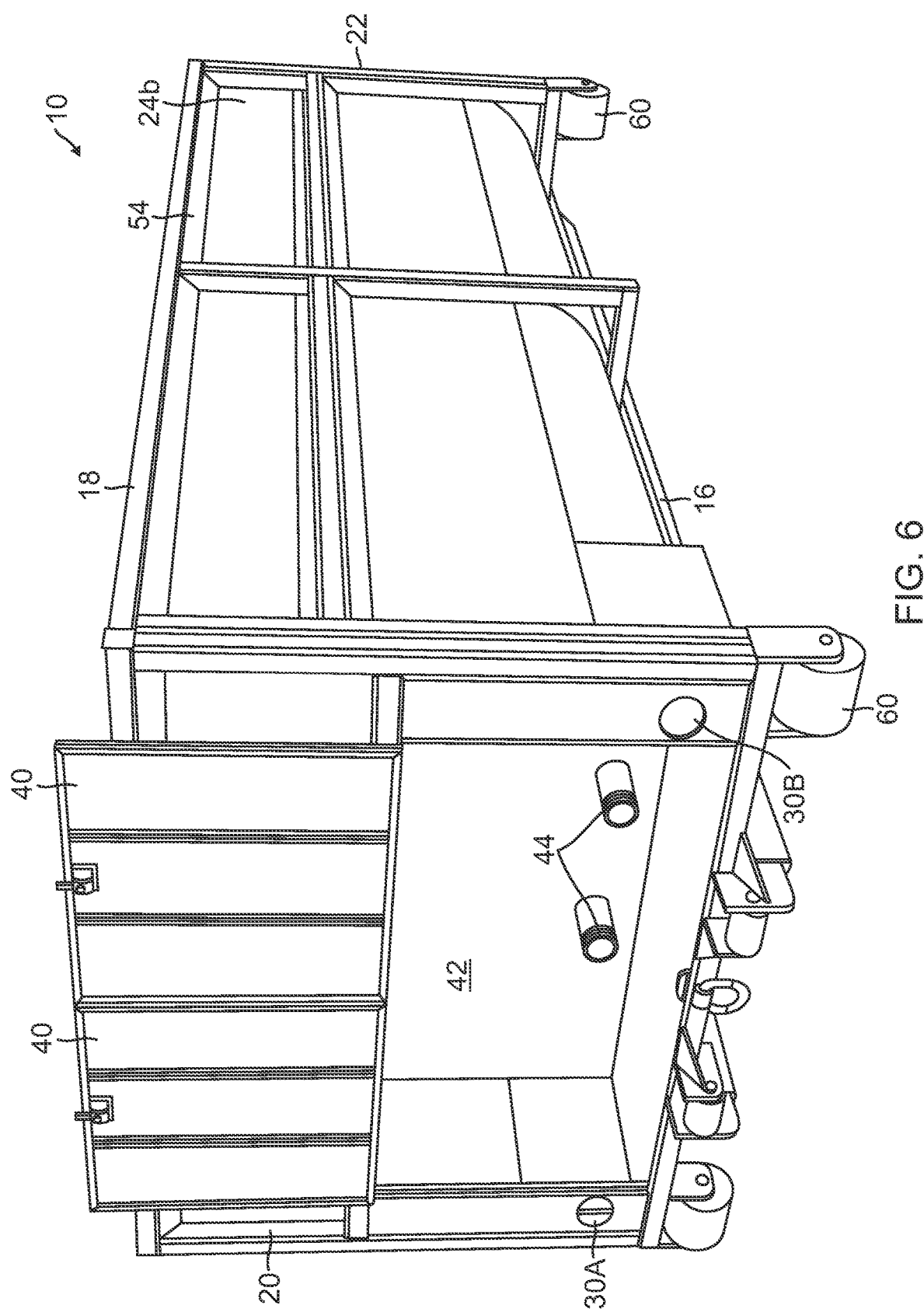
FIG. 6 is a front side perspective view of the transportable dip tank of the instant invention with the front cabinet doors open exposing the inside of this side of the dip tank.
Figure 7:
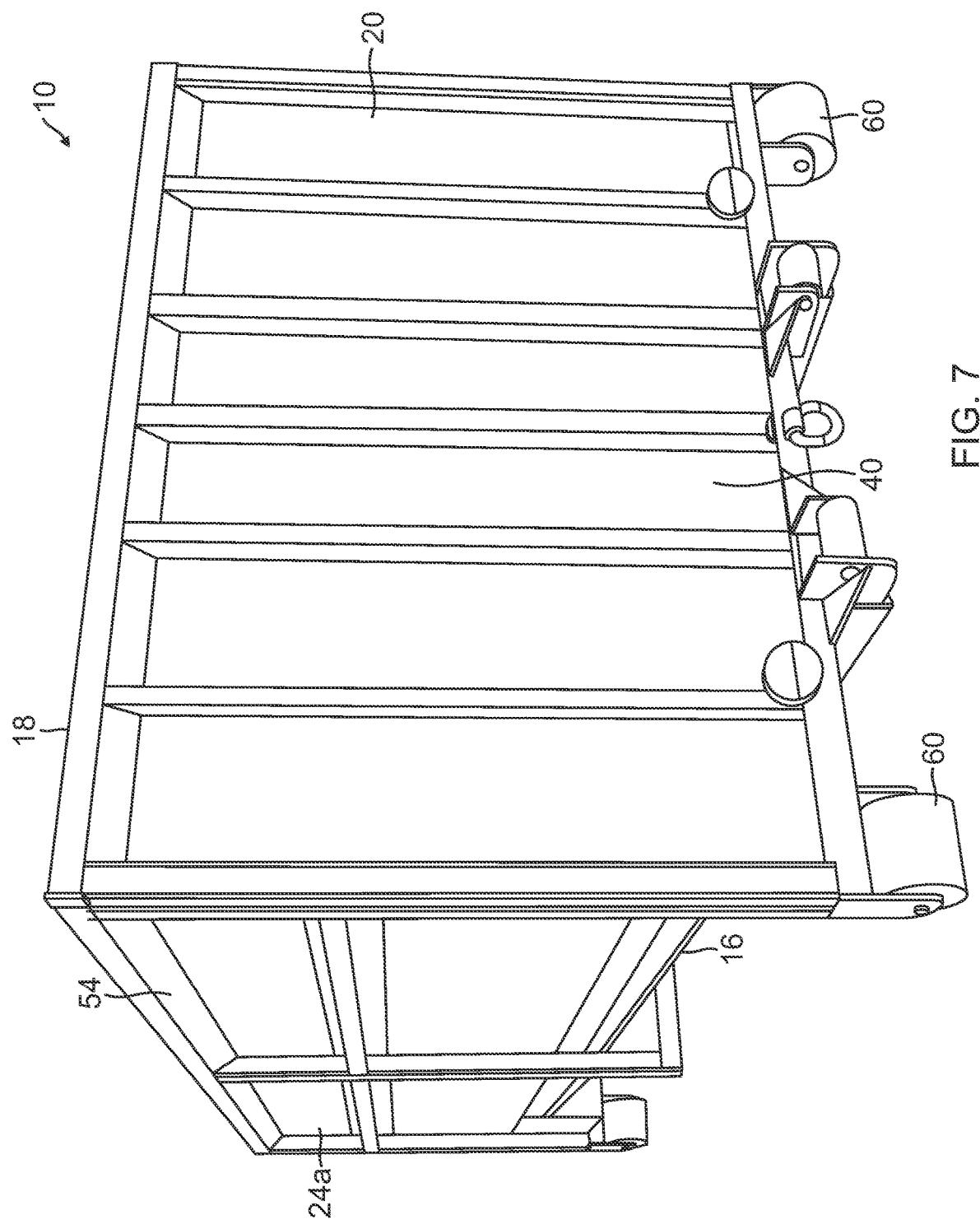
FIG. 7 is a perspective view of the front of the transportable dip tank of the instant invention.

FIG. 6 is a rear view of the dip tank 10 while FIG. 7 is a front view of the tank 10. The front door 40 opens to reveal one wall of the cistern 42 and its connectors 44 to water supply. The chamfered edges 54 are also visible in these views as well as in FIG. 2.

Figure 8:
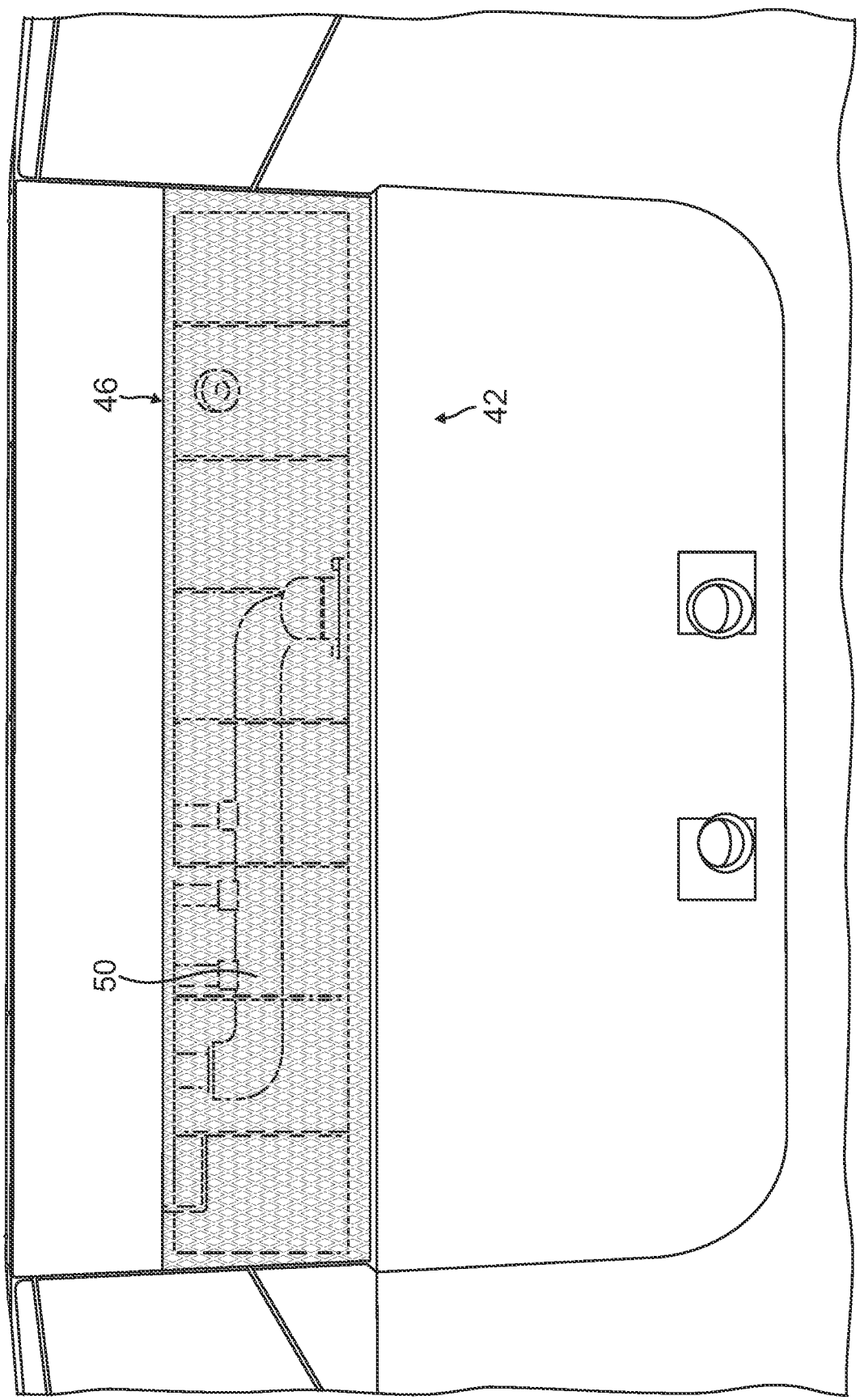
FIG. 8 is an inside view of the still well of the cistern inside of the transportable dip tank of the instant invention.
Figure 9:
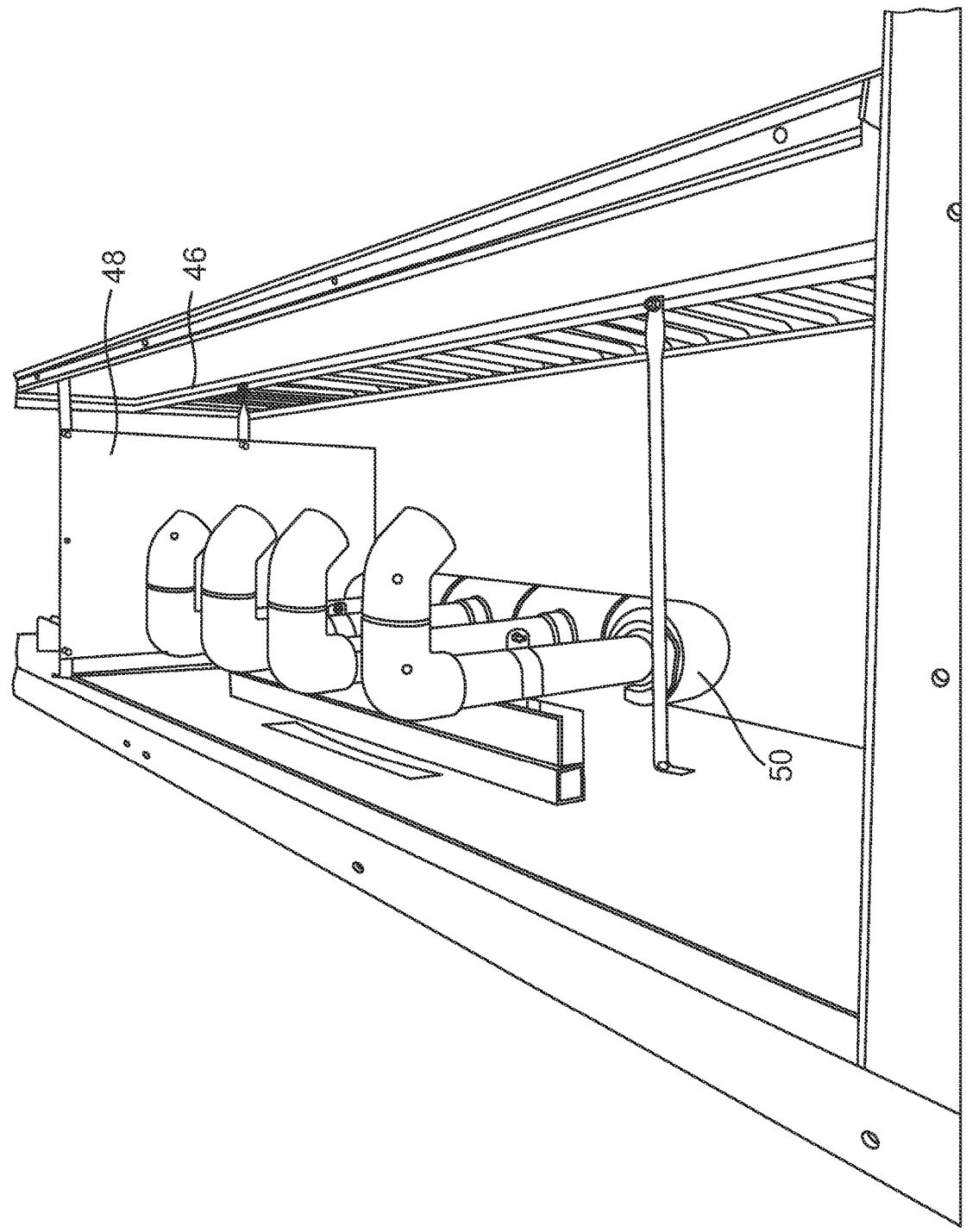
FIG. 9 is a top view of the interior of the still will of the cistern inside of the transportable dip tank of the instant invention showing the plumbing located in the air gap.
Figure 10:
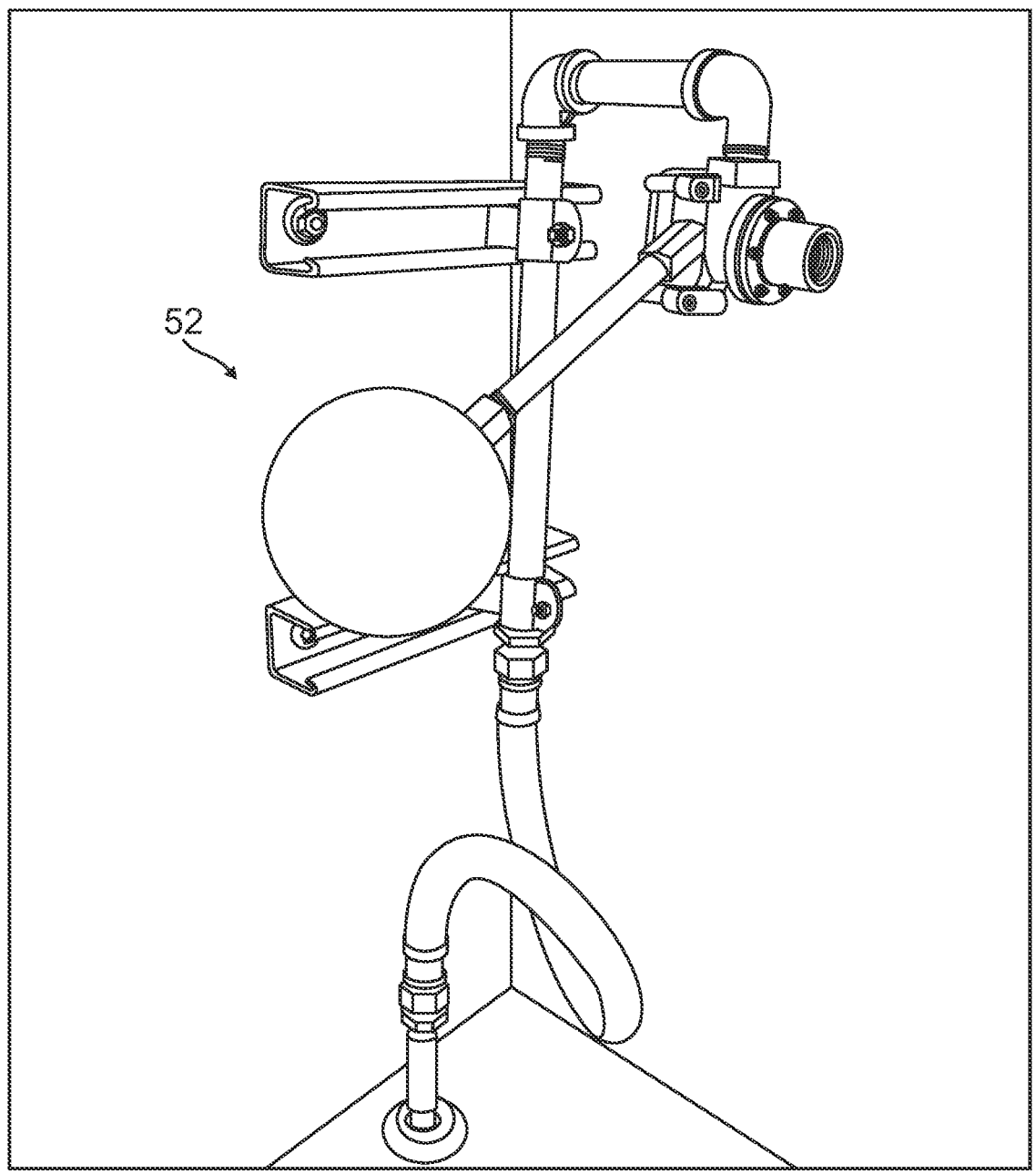
FIG. 10 is a close view of the float ball assembly portion of the auto fill/auto regulating valve inside of the still well of the cistern of the transportable dip tank of the instant invention.

FIG. 8 shows the still well 46 of the cistern 42 while FIG. 9 shows a top view where the plumbing 50 is also visible. FIG. 9 shows a top view of the interior of the still will of the cistern inside of the transportable dip tank of the instant invention showing the plumbing located in the air gap. FIG. 10 shows a close view of the float ball assembly portion of the auto fill/auto regulating valve inside of the still well of the cistern of the transportable dip tank. FIG. 12 is a top view of the cistern 42 where the interior lights 56 and exterior lights 58 are visible. Exterior lights can also be attached to the outer portion of the tank 10 itself.

The invention disclosed herein suitably may be practiced in the absence of any element which is not specifically disclosed herein.

The discussion disclosed in this patent is intended to serve as a basic description. The reader should be aware that the specific discussion may not explicitly describe all embodiments possible, and the alternatives are implicit. Also, this discussion may not fully explain the generic nature of the invention and may not explicitly show how each element can actually be representative or equivalent elements. Again, these are implicitly included in this disclosure. Where the device is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each variation, be it a variation of any apparatus embodiment, a method embodiment, or even merely a variation of any element of these. Particularly, it should be understood as the disclosure relates to elements of the invention, the words for each element may be expressed by equivalent apparatus terms even if only the function or the result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action that the physical element facilitates. Such changes and alternative terms are to be understood to be explicitly included in the description.

What is claimed is:

1. A mobile, portable, transportable intact dip tank for use in firefighting operations to support aerial and ground-based firefighting comprising:
   a top side;
   a bottom side
   a front side;
   a rear side;
   a first side; and
   a second side
wherein an interior portion is defined by a connection of said top, bottom, front, rear, first and second sides;
   a cistern housed in said interior portion;
   a still well in said cistern;
   an auto fill/auto regulating valve with a float ball assembly in said still well;
   a cabinet is housed in said interior portion proximate said rear side; and
   cabinet doors on said rear side that are openable and closeable to reveal or obscure said cabinet.

2. The dip tank as defined in claim 1 further comprising wheels attached said bottom side.

3. The dip tank as defined in claim 1 wherein said cistern houses liquids, said liquids coming from the group comprising: water, retardants, enhancers.

4. The dip tank as defined in claim 1 wherein said dip tank is made of steel.

5. The dip tank as defined in claim 1 wherein said first side and said second have chamfered edges.

6. The dip tank as defined in claim 1 wherein said cistern has lights incorporated into an interior portion of said cistern.

7. The dip tank as defined in claim 1 wherein said cistern has lights incorporated into an exterior portion of said cistern.

8. The dip tank as defined in claim 1 wherein lights are affixed to an exterior of said dip tank.

9. The dip tank as defined in claim 1 wherein said dip tank is manually operated.

10. The dip tank as defined in claim 1 wherein said dip tank is operated remotely using a communication suite between said dip tank and a user in another location.

11. The dip tank as defined in claim 10 wherein said communication suite utilizes the world wide web, multi-wired and wireless networks including, but not limited to LAN, WLAN, WAN, MAN PAN VPN LTE, satellite, BLUETOOTH®, MESH, IR and microwave, internet, cloud, TCP, IP, HTTP, BUS, cellular networks with and without LTE, networking computers and servers, both hosted and local.

12. The dip tank as defined in claim 1 wherein bottom rails are situated on said bottom side of said dip tank for ease of rolling on and off or truck beds.

* * * * *